April 6, 1965 F. T. JASKOWIAK 3,177,032

HIGH SHEAR DAMPING MOUNT FOR VEHICLE BODY

Filed May 17, 1962

INVENTOR.
FRANK T. JASKOWIAK
BY
Howard J. Barnett
ATTORNEY

United States Patent Office 3,177,032
Patented Apr. 6, 1965

3,177,032
HIGH SHEAR DAMPING MOUNT FOR
VEHICLE BODY
Frank T. Jaskowiak, Milwaukee, Wis., assignor to A. O.
Smith Corporation, Milwaukee, Wis., a corporation of
New York
Filed May 17, 1962, Ser. No. 195,505
7 Claims. (Cl. 296—35)

This invention is directed to a body-to-frame attachment means for a land vehicle, and more particularly to a body mount which comprises a pair of flexible brackets so disposed relative to each other to support a body attachment assembly which has a high vertical damping rate.

Each bracket of the pair comprises a diagonal arm having a smaller, perpendicularly disposed flange which is disposed flatwise against the frame component and secured thereto. A horizontal flange is formed at the top of the diagonal arm and the horizontal flange is disposed above the top surface of the frame component. The arm of each bracket of a pair is disposed to converge diagonally upward towards the adjacent arm in an inverted V configuration. The respective horizontal flanges are displaced vertically to accommodate a flexible rubber shim disposed between their opposed surfaces. Additional rubber shims are disposed on the bottom surface of the lower horizontal flange and on the top surface of the upper horizontal flange. The vehicle body rests on the uppermost rubber shim, being connected to the complete support bracket by means of a conventional body bolt assembly.

The apparatus of this invention provides a body-to-frame attachment means which has a high capacity for damping vertical frame oscillations, with little or no horizontal displacement between the frame and the body. The flexible body brackets of this invention bend under an oscillating vertical load, thereby translating the vertical load into a shear load on the rubber shim disposed between the horizontal flanges of the brackets. The rubber almost completely absorbs the translated load, thereby providing an extremely effective means for damping vertical loads in a land vehicle.

The drawings illustrate the best mode presently contemplated for carrying out the invention.

Figure 3:
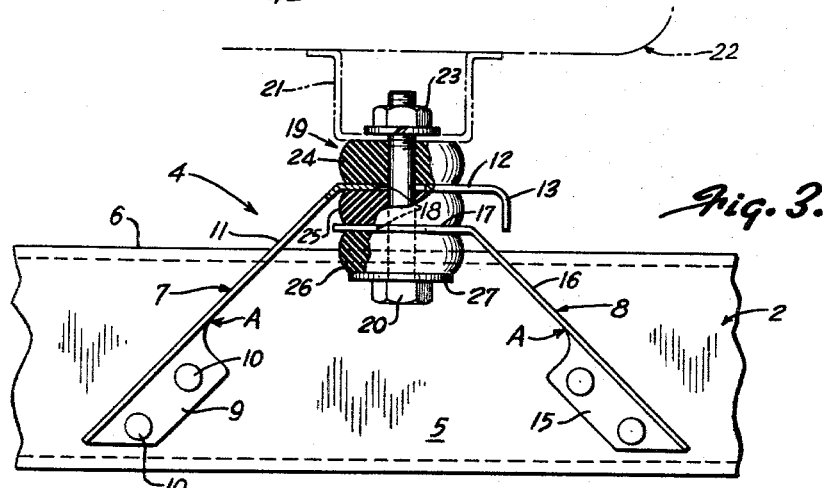
FIG. 3 is a side view of the mount shown in FIG. 2.

As shown in the drawings, a vehicle frame 1 includes a pair of sidebars 2 and 3. Sidebars 2 and 3 each have a plurality of damping mounts 4 disposed thereon on their respective outside vertical surfaces 5. As can be seen in FIG. 3, the uppermost portions of the mounts 4 extend above the top surface 6 of the sidebars 2 and 3.

Figure 1:
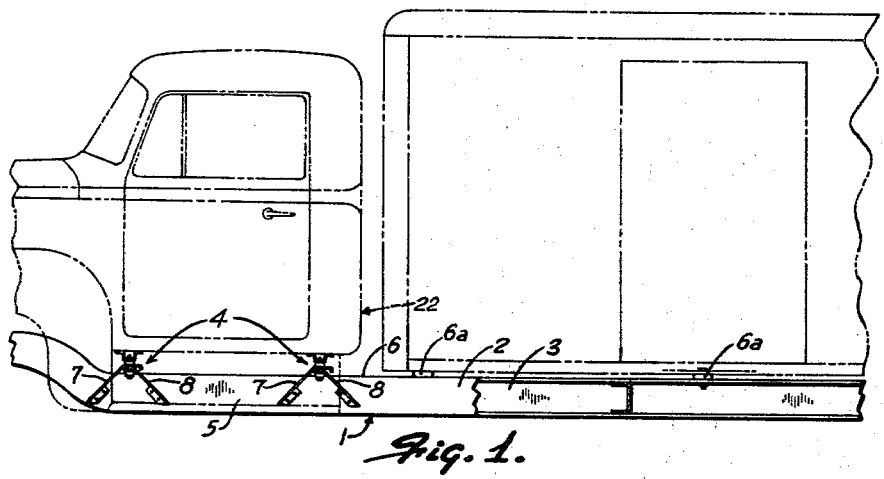
FIGURE 1 is a side elevation of a vehicle frame, with the cab and body in phantom, showing the preferred location of the damping mounts of the invention.
Figure 2:
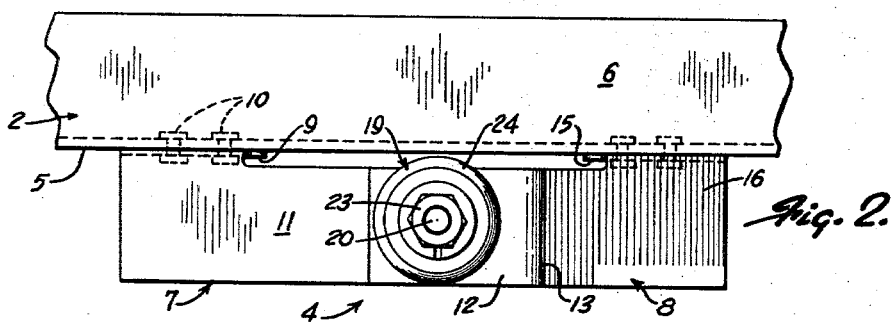
FIG. 2 is an enlarged top plan view of the mount.

In addition to the damping mounts 4, the vehicle body is supported by a plurality of conventional body mounts 6a. The relative disposition of the conventional body mounts 6a, and the damping mounts 4 is determined by the type of loading expected in the vehicle, and the damping characteristic desired in a given portion of the vehicle. In the example shown in FIGURE 1, the damping mounts 4 are disposed below the cab portion of a truck body to prevent transfer of high amplitude vertical vibrations to the truck driver in the cab.

Each damping mount 4 comprises a first flexible bracket 7, and a second flexible bracket 8. The bracket 7 includes an attachment flange 9, which is flush against the vertical surface 5 of the frame sidebar 2, and secured thereto by means of rivets 10. The bracket 7 also includes a strip or arm 11 which extends diagonally upward, and then horizontally at a level above the horizontal top surface 6 of the sidebar 2 to define a flat, horizontal platform 12. As shown in FIG. 3, the horizontal platform 12 includes a downwardly curved flange 13 to limit the amount of vertical deflection of the mount.

A second flexible bracket 8 is disposed adjacent the bracket 7 and is spaced therefrom having an attachment flange 15 to secure it to the side surface 5 of the frame sidebar 2. Bracket 8 also includes an arm 16 which extends diagonally upward towards the first flexible bracket 7 and then horizontally below the platform 12 to define a second horizontal platform 17 which is a predetermined distance directly below the platform 12. The platforms 12 and 17 each have an oversized opening 18 therein to receive a body-to-frame attachment assembly 19.

The body-to-frame attachment assembly 19 comprises a bolt 20, which extends up through the openings 18 in both platforms 12 and 17 to connect the frame to a body crossbar 21, which is rigidly secured to a vehicle body 22. The body crossbar 21 is secured to the bolt 20 by means of a lock nut 23.

A plurality of rubber shims 24, 25 and 26 are disposed on the bolt 20 to provide resilient damping means in cooperation with the flexible brackets 7 and 8. The shim 24 is disposed between the body crossbar 21 and the first platform 12, principally to prevent metal-to-metal contact. The bottom shim 26 is disposed below the bottom platform 17 and is retained in place on the bolt 20 by means of a retaining washer 27.

The center shim 25 is disposed between the platforms 12 and 17, and is the principal damping means which cooperates with the flexible brackets 7 and 8 to provide a high vertical damping rate.

In operation, the flexible brackets 7 and 8 bend at "A" as indicated in FIG. 3. Because the flanges 11 and 16 extend diagonally upward from their respective attachment points on the sidebar 2, vertical oscillations of the frame are translated into a horizontal or fore-and-aft shear movement of the horizontal platforms 12 and 17.

The shear movement of the platforms 12 and 17 causes the center rubber shim 25 to absorb twice the shear deflection absorbed by the upper shim 24 and the lower shim 26.

The total shear deflection of all three rubber shims 24, 25 and 26 is very large, and because damping in rubber is proportional to the deflection, a very efficient high damping mount is obtained which provides a smooth and comfortable "ride" to the occupant of the vehicle.

The curved flange 13 acts as a vertical stop to prevent overstressing of the brackets 7 and 8. In addition, the bottom rubber 26 functions as a lateral stop against the sidebar 2 to prevent excessive lateral motion of the mount 4.

The damping mount of this invention combines the resiliency, strength and high recovery rate of steel with the superior damping characteristics of rubber to provide a durable, high shear damping mount in a frame type vehicle.

Various modes of carrying out the invention are contemplated as being within the scope of the following claims particularly pointing out and distinctly claiming the subject matter which is regarded as the invention.

I claim:

1. A vehicle body mount construction for attaching a vehicle body to a frame at a plurality of attachment points, which comprises a plurality of rubber load mounts having a high static loading strength, said load mounts being disposed on the vehicle frame at the points which are subject to the greatest static body load, and a plurality of body brackets having vertically flexible metal flange portions integral therewith, said flange portions being disposed in a plane transverse to the long axis of the frame and defining a generally pyramidal configuration in relation to each other when viewed in the plane of said flanges disposed at the attachment points where the frame is subject to the greatest amplitude of vertical vibrations to provide a vehicle body mounting system which isolates substantially all undesirable vertical vibrations from the vehicle compartment.

2. In a vehicle body mounting system for attaching a vehicle body to a frame, a vertically flexible bracket which comprises a first member secured to the frame, a second member attached to the frame adjacent said first member and disposed to converge towards said first member along the long axis of said frame in cooperable relationship to said first member, said first and second members each having a diagonally disposed, vertically flexible flange portion integral therewith to provide a vertically flexible, horizontally rigid mounting bracket at the points in the vehicle body mounting system where the greatest damping of vertical amplitude vibrations is required.

3. The apparatus of claim 2, in which the first member and the second member each includes attachment means for securing said member to the side surface of said frame.

4. The apparatus of claim 3, in which the first member and the second member each includes means extending above the frame for supporting a rubber mounting assembly to thereby avoid direct contact between the vehicle frame and body.

5. The apparatus of claim 3, in which the two means for supporting the rubber mounting assembly are disposed in vertically spaced relationship to accommodate a rubber shim therebetween, thereby avoiding direct contact between the first and second members.

6. A composite, flexible damping bracket for attaching a vehicle body to a vehicle frame at a plurality of attachment points comprising, a first flexible bracket secured to a vertical side surface of the frame and extending diagonally upward above the top surface of the frame at the attachment points, a first horizontal platform disposed above the top surface of the frame and supported by said flexible bracket, a second flexible bracket secured to said vertical side surface of said frame adjacent said first flexible bracket and extending diagonally upwardly above the top surface of said frame to converge towards said first flexible bracket, a second horizontal platform disposed above the top surface of the frame and supported by said second flexible bracket, said second horizontal platform being disposed in spaced vertical relationship to said first horizontal platform, a rubber shim disposed between said horizontal platforms and a rubber mounting assembly secured to both flexible brackets and to the attachment point on the vehicle body to provide a resilient body to frame attachment having a high damping rate.

7. A composite, flexible damping bracket for damping vibrations between a vehicle frame and body comprising, a first flexible bracket secured to a side surface of the frame and extending diagonally upward above the top surface of the frame, said bracket having a diagonal strip portion of greater width than thickness disposed edgewise with respect to the siderail to flex in a fore and aft direction, said diagonal strip portion being secured to the frame only at its lower end to provide maximum flexing, and having a horizontally upper end portion integral with said diagonal strip portion, and a second flexible bracket secured to the side surface of said frame adjacent said first flexible bracket and extending diagonally upwardly above the top surface of said frame to converge towards said first flexible bracket, said second flexible bracket having a horizontal upper end portion overlapping the upper end portion of said first flexible bracket, said first and second brackets being spaced apart at the overlap portion by means of a resilient material disposed between the upper end portions of said first and second flexible brackets, said second flexible bracket also having a diagonal strip portion of greater width than thickness disposed edgewise with respect to the siderail to flex in a fore and aft direction, said diagonal strip portion being secured to the frame only at its lower end to provide maximum flexing, said vehicle body being disposed and supported on the upper horizontal end portions of said brackets, said first and second flexible brackets thereby cooperating to provide a vehicle body mounting means having a high vertical damping rate and high horizontal stability.

References Cited by the Examiner
UNITED STATES PATENTS

| 2,062,760 | 12/36 | Overstrom. | |
| 2,171,947 | 9/39 | Parker | 296—35 |
| 2,384,096 | 9/45 | Kishline | 296—35 |

FOREIGN PATENTS 1,089,284　6/59　Germany.

PHILIP ARNOLD, *Primary Examiner.*